UNITED STATES PATENT OFFICE.

LEO H. BAEKELAND, OF YONKERS, NEW YORK, ASSIGNOR TO ROBESON PROCESS COMPANY, OF CAMDEN, NEW JERSEY, A CORPORATION OF NEW JERSEY.

IMPREGNATED WOOD AND METHOD OF PREPARING THE SAME.

1,057,519.   Specification of Letters Patent.   Patented Mar. 25, 1913.

No Drawing.  Application filed November 21, 1907, Serial No. 403,226.  Renewed June 11, 1910.  Serial No. 566,356.

*To all whom it may concern:*

Be it known that I, LEO H. BAEKELAND, a citizen of the United States, residing at "Snug Rock," Harmony Park, Yonkers, in the county of Westchester and State of New York, have invented certain new and useful Improvements in Impregnated Wood and Methods of Preparing the Same, of which the following is a specification.

This invention relates to the impregnation of wood with materials adapted to increase its strength and hardness and to improve its keeping and fire-resisting properties.

According to the invention the wood is impregnated and its pores charged with the dissolved matters of the waste liquor resulting from the preparation of wood pulp by the so-called sulfite or bisulfite process, other materials and more particularly mineral salts having a fire-proofing or antiseptic action being added if desired.

The liquor flowing from the pulp digesters, after the cooking process, is rich in colloidal organic extractive matters and bodies having tanning properties and contains also calcium and other salts of complex oxysulfur acids. The products contained in this liquor have an antiseptic action, and possess the property of coagulating or rendering insoluble some of the albuminoids and other putrescible compounds ordinarily present in fresh wood. At the same time these various compounds, organic and inorganic, after drying in the wood pores and in or between the wood cells and fibers, harden the wood, render it more resistant to pressure or breaking stresses, and permit it to receive and retain an improved finish.

In its simplest form, the invention may be practised by treating the wood with waste sulfite liquor exclusively as by soaking the wood in the waste liquor until the latter has penetrated to a sufficient extent, after which the wood is withdrawn and dried. Impregnation may be improved or accelerated by any of the well known methods involving the use of boiling or vacuum or pressure as by boiling or heating under pressure. As the sulfite liquor ordinarily possesses a slightly acid reaction it is generally advisable to add an alkaline product, as for instance lime or a soluble alkali or alkaline salt, as for instance sodium silicate. This promotes the antiseptic effect. The liquor may be employed as it flows from the digesters, or it may be concentrated by preliminary evaporation to form a thick liquid, in which case an increased effect is noted. I have found that the soluble colloidal matters or extractives of the liquor exert a very marked influence in preventing or retarding crystallization of inorganic salts, and for this reason considerably larger proportions of mineral fire-proofing or antiseptic salts may be used in conjunction with such extractives, or with the liquor containing them, without liability of producing ultimate efflorescence or crystallization of the salts or of rendering the product hygroscopic, from or in wood treated therewith and that by using such larger proportions of salts an improved product is obtained. This effect is particularly noticeable with sodium silicate (water glass) which when used alone is apt to give efflorescence. The fire-proofing qualities of the wood may be improved by the use in conjunction with the sulfite liquor of soluble salts commonly employed in fire-proofing, such for instance as salts of aluminum, the alali metals or ammonium, soluble phosphates or tungstates, etc., or mixtures of these. These salts are added to the sulfite liquor or applied in solution to the wood before or after the treatment with sulfite liquor. In a similar manner zinc chlorid and other compounds having an antiseptic effect may be used. After the impregnation in any of the described ways is complete the wood is dried by any usual means.

In case the sulfite liquor is deficient in extractives or tanning agents, these may be added in any desired proportion. In case it is desired to stain or dye the wood, dyeing materials or color-producing materials may be added to the various described solutions.

"Sulfite waste liquor" and "sulfite liquor" are technical terms used for the effluent liquor from the pulp digesters in the sulfite process of making paper pulp, or the liquor in a concentrated form. The terms are used in this sense in the present case. In the digestion of the wood, about half of the wood, roughly speaking, remains behind as "cellulose" or paper pulp while the other half goes into solution, forming the sulfite liquor. In this liquor most of the bisulfite of the original bisulfite solution has disappeared as such, forming complex sulfur-containing colloid bodies or salts of oxysulfur acids with the "lignone" constituents of the wood and the bases of the bisulfites originally present. As these bodies are, at least in part, of the nature of salts of sulfonic acids, the characteristic colloidal dissolved bodies of sulfite liquor are frequently called, for the sake of a name, "lignosulfonates". In addition to the lignosulfonates which are the constituents giving the liquor its tanning properties and power of acting on albuminoid materials, there are of course minor amounts of sugars, gums, etc., present, but the characteristic and valuable bodies are these lignosulfonates.

In a way, sulfite liquor may be said to be dissolved wood; and in impregnating wood with it, the pores are thereby filled with material which does not materially alter the desirable physical characteristics and properties of the wood so impregnated.

I claim:

1. The method of treating wood which comprises impregnating its pores with sulfite waste liquor.

2. The method of treating wood which comprises impregnating its pores with antiseptic compounds in conjunction with sulfite waste liquor.

3. The method of treating wood which comprises impregnating its pores with mineral salts in conjunction with sulfite waste liquor.

4. As a new article of manufacture, wood having its pores impregnated with solid constituents of sulfite waste liquor.

5. As a new article of manufacture, wood having its pores impregnated with mineral salts and with the solid constituents of sulfite waste liquor.

6. As a new article of manufacture, wood having its pores impregnated with mineral salts and with the solid constituents of sulfite waste liquor and with dyeing or coloring materials.

7. The herein described method which comprises treating a fibro-cellular body with sulfite waste liquor under the action of heat and pressure.

8. The process of preserving wood which comprises impregnating its pores with waterglass and with the organic matters of sulfite waste liquor.

9. The method of treating wood which comprises impregnating it with material comprising the characteristic sulfur-containing colloid constituents of sulfite waste liquor.

10. As a new article of manufacture wood having its pores impregnated with a preserving material comprising the characteristic sulfur-containing colloid bodies of sulfite waste liquor.

In testimony whereof, I affix my signature in presence of two witnesses.

LEO H. BAEKELAND.

Witnesses:
   FRED R. CASEY,
   MARY E. SCHOLDING.